(12) United States Patent
Puccio et al.

(10) Patent No.: US 7,961,105 B2
(45) Date of Patent: *Jun. 14, 2011

(54) WEIGHTED SAW REFLECTOR GRATINGS FOR ORTHOGONAL FREQUENCY CODED SAW TAGS AND SENSORS

(75) Inventors: Derek Puccio, Cottonwood Heights, UT (US); Donald Malocha, Winter Springs, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 0 days.
This patent is subject to a terminal disclaimer.

(21) Appl. No.: 12/780,321

(22) Filed: May 14, 2010

(65) Prior Publication Data
US 2010/0271209 A1 Oct. 28, 2010

Related U.S. Application Data

(62) Division of application No. 11/508,674, filed on Aug. 23, 2006, now Pat. No. 7,777,625.

(60) Provisional application No. 60/711,278, filed on Aug. 25, 2005.

(51) Int. Cl.
*G08B 13/14* (2006.01)

(52) U.S. Cl. ............... 340/572.1; 340/568.1; 340/539.1; 340/10.1

(58) Field of Classification Search ............... 340/572.1, 340/568.1, 539.1, 572.2–572.9, 10.1; 310/311, 310/313 R, 313 D
See application file for complete search history.

(56) References Cited

U.S. PATENT DOCUMENTS

| | | | |
|---|---|---|---|
| 4,166,258 A | 8/1979 | Tseng | |
| 5,187,718 A | 2/1993 | Takehara | |
| 5,434,893 A | 7/1995 | Le Roy | |
| 5,602,800 A | 2/1997 | Duggal | |
| 5,670,920 A * | 9/1997 | Morgan | 333/195 |
| 5,761,196 A | 6/1998 | Ayerst | |
| 5,895,996 A | 4/1999 | Takagi | |
| 5,909,461 A | 6/1999 | Koga | |
| 6,265,807 B1 | 7/2001 | Koga | |
| 6,424,916 B2 | 7/2002 | Nysen | |
| 6,966,493 B2 | 11/2005 | Hartmann | |

(Continued)

OTHER PUBLICATIONS

Malocha, et al., Saw Sensors Using Orthogonal Frequency Coding, IEEE International, 2004, retrieved from http://www.caat.engr.ucf.edu/Publications/SAW%20%20Orthogonal%20Frequency%20Coding.pdf, retrieved on Aug. 17, 2006.

(Continued)

*Primary Examiner* — Daniel Previl
(74) *Attorney, Agent, or Firm* — Brian S. Steinberger; Phyllis K. Wood; Law Offices of Brian S. Steinberger, P.A.

(57) ABSTRACT

Weighted surface acoustic wave reflector gratings for coding identification tags and sensors to enable unique sensor operation and identification for a multi-sensor environment. In an embodiment, the weighted reflectors are variable while in another embodiment the reflector gratings are apodized. The weighting technique allows the designer to decrease reflectively and allows for more chips to be implemented in a device and, consequently, more coding diversity. As a result, more tags and sensors can be implemented using a given bandwidth when compared with uniform reflectors. Use of weighted reflector gratings with OFC makes various phase shifting schemes possible, such as in-phase and quadrature implementations of coded waveforms resulting in reduced device size and increased coding.

5 Claims, 18 Drawing Sheets

U.S. PATENT DOCUMENTS

| | | | |
|---|---|---|---|
| 6,992,547 B2 | | 1/2006 | Bergmann |
| 7,005,964 B2 | * | 2/2006 | Edmonson et al. .......... 340/10.1 |
| 2002/0105392 A1 | * | 8/2002 | Fujii ............................ 333/193 |
| 2003/0231107 A1 | | 12/2003 | Edmonson |

OTHER PUBLICATIONS

Malocha et al., Orthogonal Frequency Coding for SAW Device Applications, Ultrasonics Symposium IEEE, 2004, pp. 1082-1085, vol. 2.

Malocha, et al., Orthogonal Frequency Coding for SAW TAgging and Sensors, Inst. of Electrical and Electronics Engineers, retrieved from http://www.ieee-uffc.org/archive/uffc/trans/Toc/abs/06/t0620377.htm, retrieved on Aug. 11, 2006, abstract.

Puccio, et al., Implementation of Orthogonal Frequency Coded SAW Devices Apodized Reflectors, Frequency Control Symposium and Exposition, Proceedings of the IEEE International, 2005, pp. 892-896.

Carter, et al., SAW Device Implementation of a Weighted Stepped Chirp Code Signal for Direct Sequence Spread Spectrum Communication Systems, IEEE Transactions on Ultrasonics, Ferroelectrics, and Frequency control, 2000, pp. 967-973, vol. 47.

Omori, et al., Optimisation of Weighted SAW Gratings Reflectors with Minimized Time Delay Deviation, Proc. IEEE International Frequency Control Symposium and PDA Exhibition, 2001, pp. 666-670.

Wright, Modeling and Experimental Measurements of the Reflection Properties of SAW Metallic Gratings, Proc. IEEE International Ultrasonics Symposium, 1984, pp. 54-63.

Tanski, SAW Resonators Utilizing Withdrawal Weighted Reflectors, IEEE Transactions on Sonics and Ultrasonics, 1979, pp. 404-410, vol. 26, No. 6.

White, et al., Synthesis and Design of Weighted Reflector Banks for SAW Resonators, Proc. IEEE International Ultrasonics Symposium, 1978, pp. 634-638.

Carter, SAW Device Implementation of a Weighted Stepped Chirp Code Signal for Direct Sequence Spread Spectrum Communications Systems, IEEE, 2000.

* cited by examiner

WEIGHTED SAW REFLECTOR GRATINGS FOR ORTHOGONAL FREQUENCY CODED SAW TAGS AND SENSORS

The patent application is a divisional application of U.S. patent application Ser. No. 11/508,674 filed on Aug. 23, 2006 which claims the benefit of priority to U.S. Provisional Patent Application No. 60/711,278 filed on Aug. 25, 2005.

STATEMENT REGARDING FEDERALLY SPONSORED RESEARCH

The subject invention was made with government support under NASA Graduate Student Research Fellowship Program Grant No. NGT10-52642. The government has certain rights in this invention.

FIELD OF THE INVENTION

This invention relates to signal coding and, in particular, to apparatus, systems, devices and methods for generating, distributing, processing and detecting orthogonal frequency coding for surface acoustic wave and silicon tags and sensors for transmission of sensor identification and information using weighted reflector gratings.

BACKGROUND AND PRIOR ART

The surface acoustic wave (SAW) sensor offers advantages in that it is wireless, passive, small and has varying embodiments for different sensor applications. Surface acoustic wave (SAW) sensors are capable of measuring physical, chemical and biological variables and have the ability to operate in harsh environments. In addition, there are a variety of ways of encoding the sensed data information for retrieval. Single sensor systems can typically use a single carrier RF frequency and a simple device embodiment, since tagging is not required. In a multi-sensor environment, it is necessary to both identify the sensor as well as obtain the sensed information. The SAW sensor then becomes both a sensor and a tag and must transmit identification and sensor information simultaneously.

Known SAW devices include delay line and resonator-based oscillators, differential delay lines, and devices utilizing multiple reflective structures. Single sensor systems can typically use a single carrier frequency and a simple coding technique, since tagging is not required. However, there are advantages of using spread spectrum techniques for device interrogation and coding, such as enhanced processing gain and greater interrogation power.

The use of orthogonal frequencies for a wealth of communication and signal processing applications is well known to those skilled in the art. Orthogonal frequencies are often used in an M-ary frequency shift keying (FSK) system. There is a required relationship between the local, or basis set, frequencies and their bandwidths which meets the orthogonality condition. If adjacent time chips have contiguous local stepped frequencies, then a stepped chirp response is obtained. See S. E. Carter and D. C. Malocha, "SAW device implementation of a weighted stepped chirp code signal for direct sequence spread spectrum communication systems", IEEE Transactions on Ultrasonics, Ferroelectrics, and Frequency control, Vol. 47, July 2000, pp. 967-973.

Orthogonal frequency coding is a spread spectrum coding technique that has been successfully applied to SAW tags and sensors as described in D. Puccio, D. C. Malocha, D. Gallagher, J. Hines, "SAW sensors using orthogonal frequency coding," Proc. IEEE International Frequency Control Symposium, 2004, pp. 307-310. OFC offers several advantages over single frequency SAW tags and sensors including enhanced processing gain, increased range using chirp interrogation, and improved security. In addition, OFC relies on the use of several frequencies making simultaneous sensing and tagging possible in multiple sensor environments. OFC SAW devices are implemented using reflectors with periodicities chosen to match the chip frequency of interest.

As a result, an OFC SAW device contains a series of reflectors whose center frequencies correspond to the OFC signal of interest. In the case of high reflectivity or narrow bandwidth materials, it is desirable to control the reflection and transmission characteristics of each reflector. The present invention uses weighted reflectors as a method of controlling the reflected and transmitted SAW energy. In addition, arbitrary pulse shapes can be achieved using reflector weighting. Furthermore, pulse shaping can be used inphase shift keying, such as inphase and quadrature channels in minimum shift keying (MSK).

SUMMARY OF THE INVENTION

A primary objective of the invention is to provide a new method, system, apparatus and device for applying weighting with orthogonal frequency coding to decrease reflectively.

A secondary objective of the invention is to provide a new method, system, apparatus and device that uses weighting with orthogonal frequency coding to allow more chips to be implemented on a device and increases code diversity.

A third objective of the invention is to provide a new method, system, apparatus and device that uses apodized reflectors with orthogonal frequency coding in surface acoustic wave devices in tags and sensors to increase the number of tags and/or sensors that can be employed using a given bandwidth.

A fourth objective of the invention is to provide a new method, system, apparatus and device that uses weighting with orthogonal frequency coding to make various phase shifting schemes possible, such as inphase and quadrature implementations of coded waveforms resulting in reduced device size and increased coding.

A first preferred embodiment of the invention provides an orthogonal frequency coding technique for applying the orthogonal frequency coding to a surface acoustic wave device for ID tags and sensors. The tag includes a transducer and a bank of reflector gratings on either side of the transducer. The reflectors are fabricated so that each reflector produces an orthogonal frequency corresponding to the carrier frequency. The device code is determined by the order of the orthogonal frequencies. The reflectors are weighted reflectors designed for implementation of orthogonal frequency coded surface acoustic wave devices. Various reflector stopband responses are implemented by spatially weighting reflectors in a fashion similar to interdigital transducer apodization. The reflector gratings include cosine weighted reflector grating, apodization weighted reflectors or withdrawl weighted reflectors for the purpose of increasing code diversity wherein each cosine reflector includes plural adjacent rectangular electrodes that staggered across a reflector aperture with a portion of the plural electrodes are connected to a first bus bar and a remaining portion of the plural rectangular electrodes are connected to a second bus bar to reduce group delay variations over the reflector aperture.

In a second embodiment, an orthogonal frequency coded device is produced by applying a transducer to a substrate, fabricating plural reflector grating on the substrate coupled with said transducer, and weighting each of said plural reflector gratings so that the plural weighted reflectors gratings generate an orthogonal frequency coded signal. The plural reflector gratings are shuffled to produce a different orthogonal frequency coded signal, wherein the code is determined by the order in which the contiguous orthogonal frequencies are used. Weighting each of said plural reflector gratings is accomplished using cosine weighted reflectors, implementing the orthogonal frequency coded device using inphase and quadrature channels and applying pseudo noise along with the inphase and quadrature channels.

Further objects and advantages of this invention will be apparent from the following detailed description of preferred embodiments which are illustrated schematically in the accompanying drawings.

DESCRIPTION OF THE PREFERRED EMBODIMENTS

Figure 1:
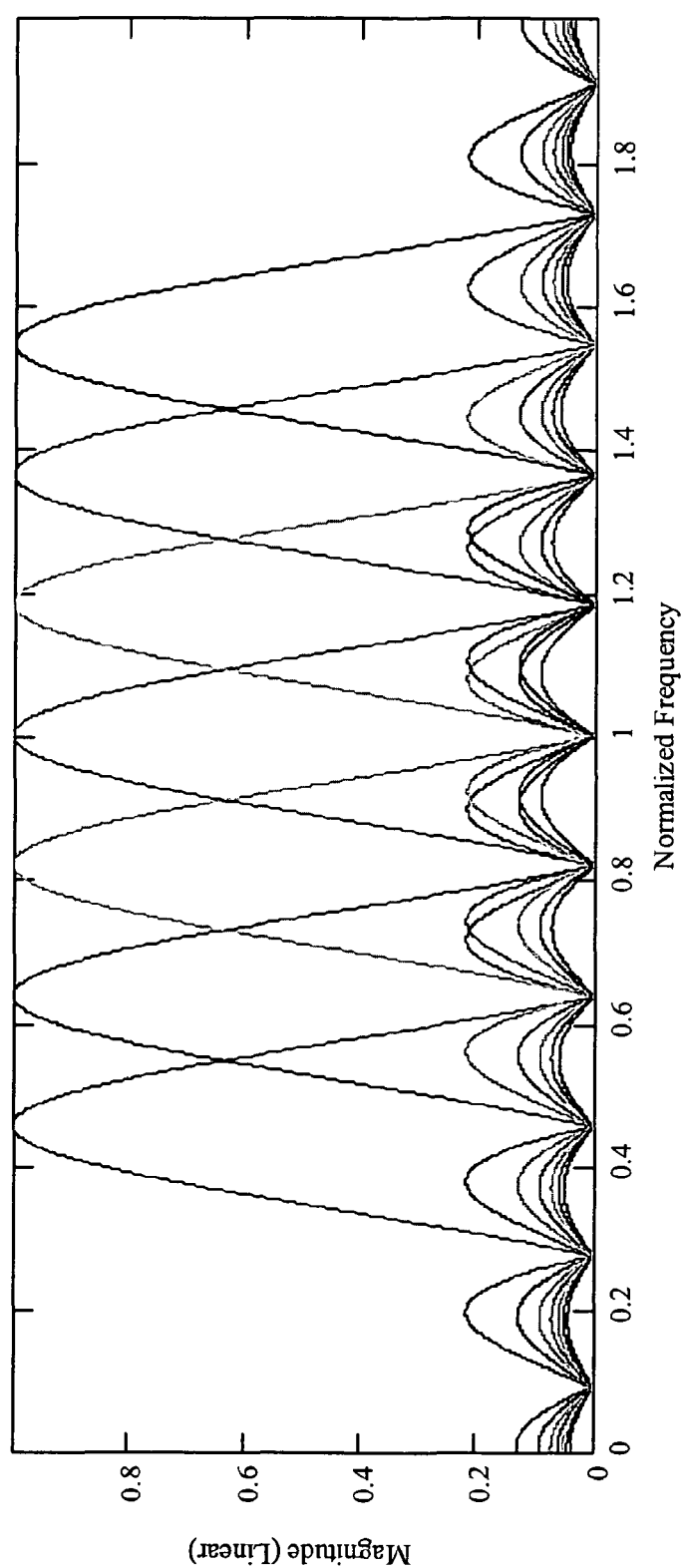
FIG. 1 is an example of a stepped chirp response.

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

The following is a list of the reference numbers used in the drawings and the detailed specification to identify components:

200 OFC SAW system
210 tag
220 up-chirp
230 tag impulse response
240 down-chirp
300 substrate
305 propogation
310 reflector gratings
320 reflector gratings
330 transducer Recently, orthogonal frequency coding (OFC) has been presented by Malocha, supra. Orthogonal frequency coding is a spread spectrum technique and has been shown to provide enhanced processing gain and reduced time ambiguity resulting in greater range and increased sensitivity when compared with single carrier frequency devices. The sensor works both as a tag and a sensor with the ability to send back "tagged" sensor information in a multi-sensor environment. The tag information is provided by a series of reflectors which map into a known chip sequence. The time-chip-sequence is coded by differing OFC and pseudo noise (PN) sequences. Implementation of an OFC sensor requires reflectors having differing local carrier frequencies. In the case of narrow fractional bandwidths or high reflectivity (such as on LiNbO3), it is preferred to adjust the reflectivity per electrode in the various chips.

Several steps must be taken in order to properly implement weighted reflectors. Both withdrawal weighting and apodization result in structures that contain various metalized and free surface regions. As a result, an accurate description of SAW velocity within these regions is critical to successful reflector design. Experimental velocity results as a function of normalized metal thickness and reflector duty cycle are given, and a discussion of the results is provided. Additionally, a two dimensional COM model has been created for analysis and design of apodized reflectors, and experimental results are compared with predictions for cosine weighted reflectors. Finally, experimental and simulated responses of an OFC SAW sensor using cosine weighted reflectors are given. The responses are applied to a simulated transceiver and results are discussed.

It would be useful to review orthogonal frequency before discussing the method, system apparatus and device for using orthogonal frequency coding for surface acoustic wave identification tags and sensors according to the present invention. Orthogonal frequencies are used to spread the signal bandwidth. The orthogonality condition describes a relationship between the local chip frequencies and their bandwidths. As an example, consider the stepped linear chirp shown in FIG. 1. Seven coherent carriers are used to generate the signal shown. Each chip contains an integer number of carrier half cycles due to the orthogonality condition. Under these conditions, the resulting waveform is continuous. The conditions, however, do not require that the local frequency of adjacent chips, that are contiguous in time, be contiguous in frequency. Instead, the time function of a bit provides a level of frequency coding by allowing a shuffling of the chip frequencies in time.

Figure 2:
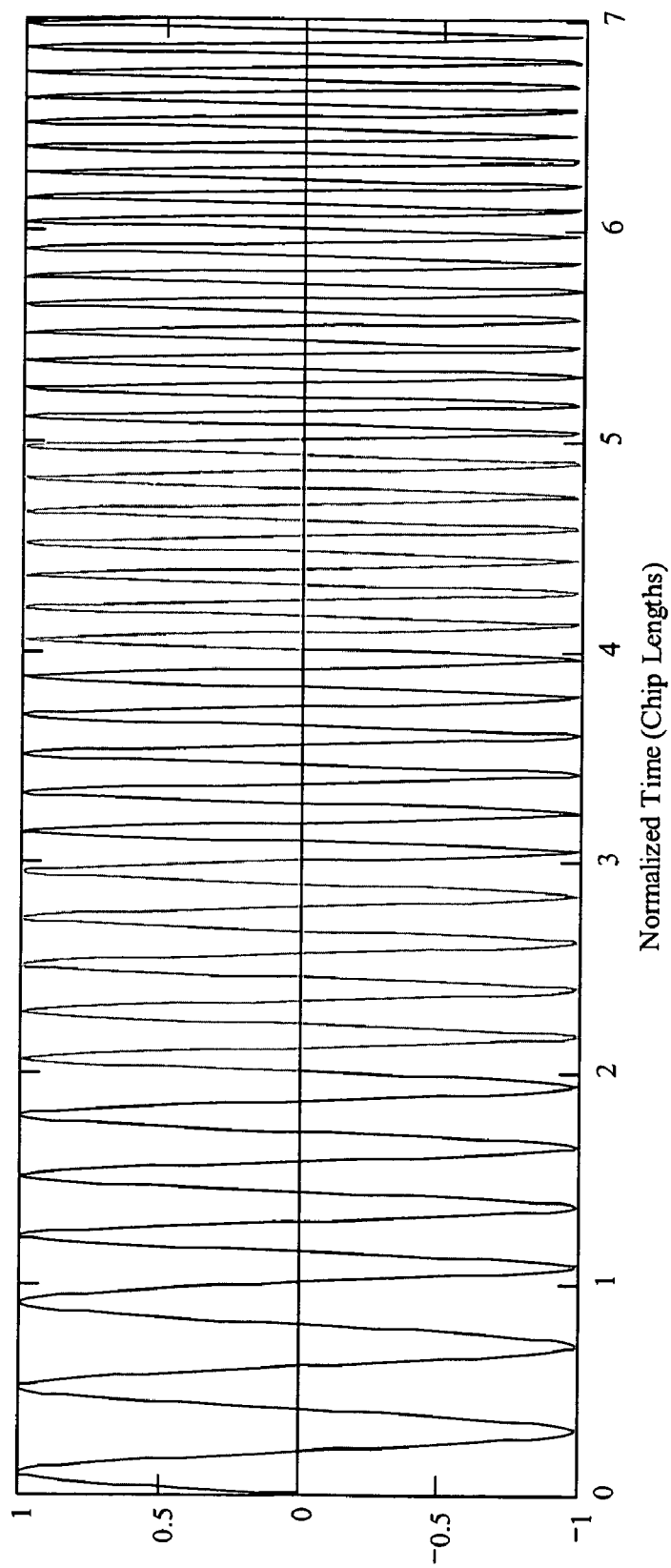
FIG. 2 is an example of an OFC chip frequency response.
Figure 3:
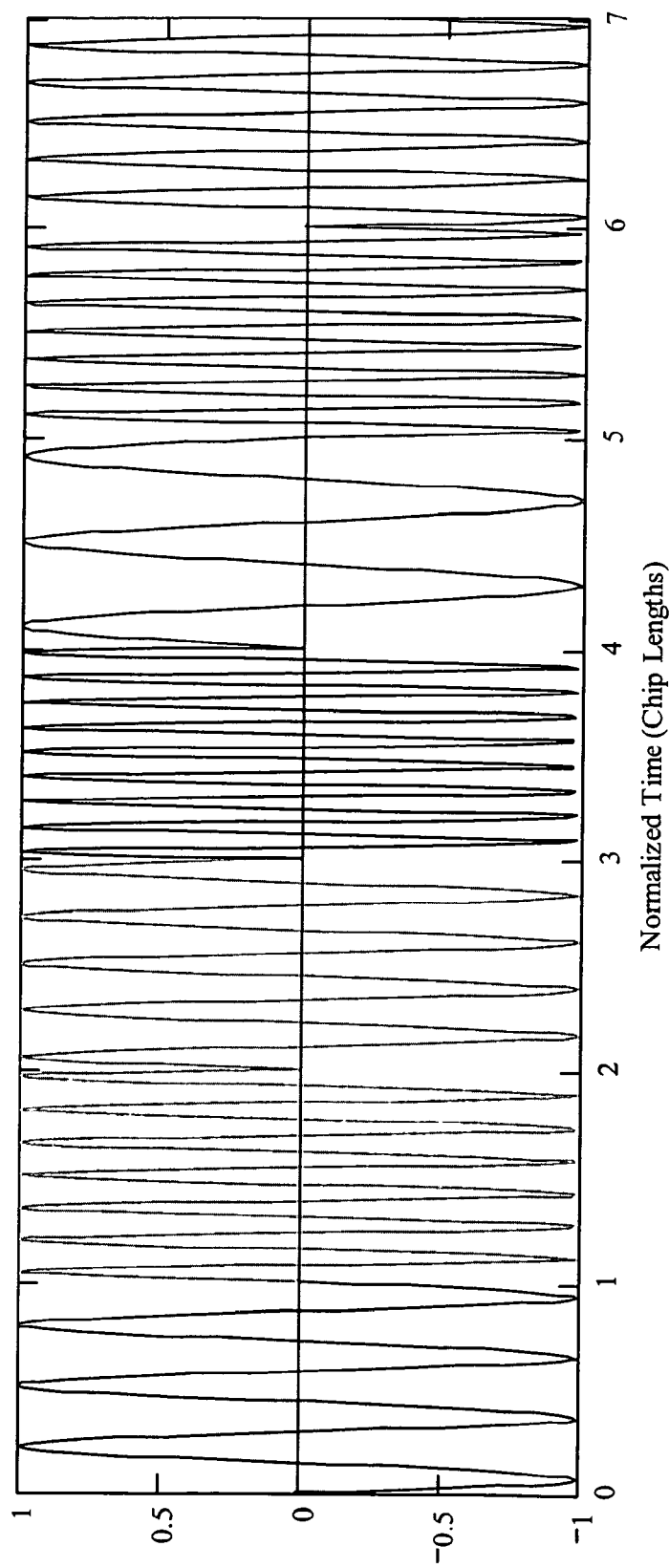
FIG. 3 is an example of a 7 chip OFC waveform based on the placement of chips.

The chip frequency response is shown in FIG. 2. These responses are a series of sampling functions with null bandwidths equal to $2 \cdot \tau^{-1}$. In addition, the sampling function center frequencies are separated by multiples of $\tau^{-1}$. Coding is accomplished by shuffling the chips to produce signal such as shown in FIG. 3, wherein the adjacent frequencies are not required to be sequential. The code is now determined by the order in which the orthogonal frequencies are used. Both signals occupy the same bandwidth and the coded information is contained within the signal phase. A more complete description of orthogonal frequency coding is given in D. C. Malocha, D. Puccio, D. Gallagher, "Orthogonal frequency coding for SAW device applications," Proc. IEEE International Ultrasonics Symposium, 2004, pp. 1082-1085, which is incorporated herein by reference.

In the example shown in FIG. 3, the seven local chip frequencies are contiguous in frequency but are not ordered sequentially in time and the chip weights are all unity. If the local chip frequencies were ordered high to low or low to high, the time sequence would be a stepped down-chirp and up-chirp, respectively. The start of the chip carrier frequency begins at zero amplitude, as seen in FIGS. 2 and 3, which is a condition of the orthogonality.

The OFC technique provides a wide bandwidth spread spectrum signal with all the inherent advantages obtained from the time-bandwidth product increase over the data bandwidth. The OFC concept allows for a wide bandwidth, chirp interrogation, frequency and binary coding per bit, a reduced compressed pulse width as compared to a pseudo noise sequence, and a secure code. The OFC technique of the present invention can be applied to ultra-wide-band applications since the fractional bandwidth can exceed 20% and can be used in a multi-tag or sensor environment by using proper coding techniques.

Figure 4:
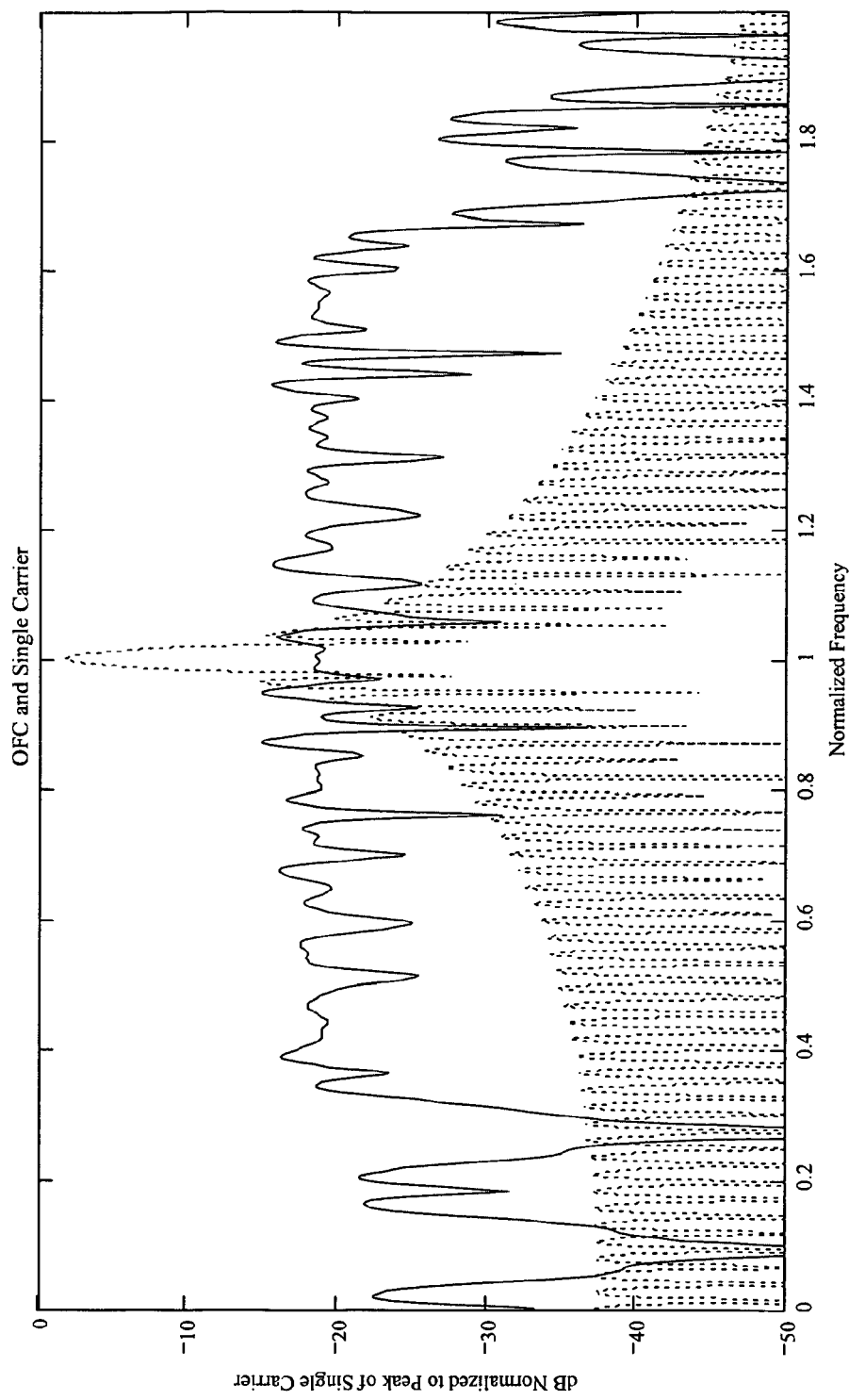
FIG. 4 is a frequency response of a 7 chip OFC device (solid line) and a single carrier (dashed line).

The given chip sequence represents the OFC for the bit. If there are J-chips with J different frequencies in a bit, then there are J factorial possible permutations of the frequencies within the bit. A signal can be composed of multiple bits, with each bit having the same OFC or differing OFC. For the case of a signal, J-chips long and having a single carrier frequency, the signal is a simple gated RF burst $\tau_B$ long. The frequency responses of a 7 bit OFC (solid line) and a single carrier signal (dashed line) are shown in FIG. 4, with both time functions normalized to unity and having identical impulse response lengths. The single carrier, shown as the dashed line, is narrowband and has approximately 17 dB greater amplitude at center frequency, as compared to the OFC (J=7), shown as a solid line, which has a much wider bandwidth.

Figure 5:
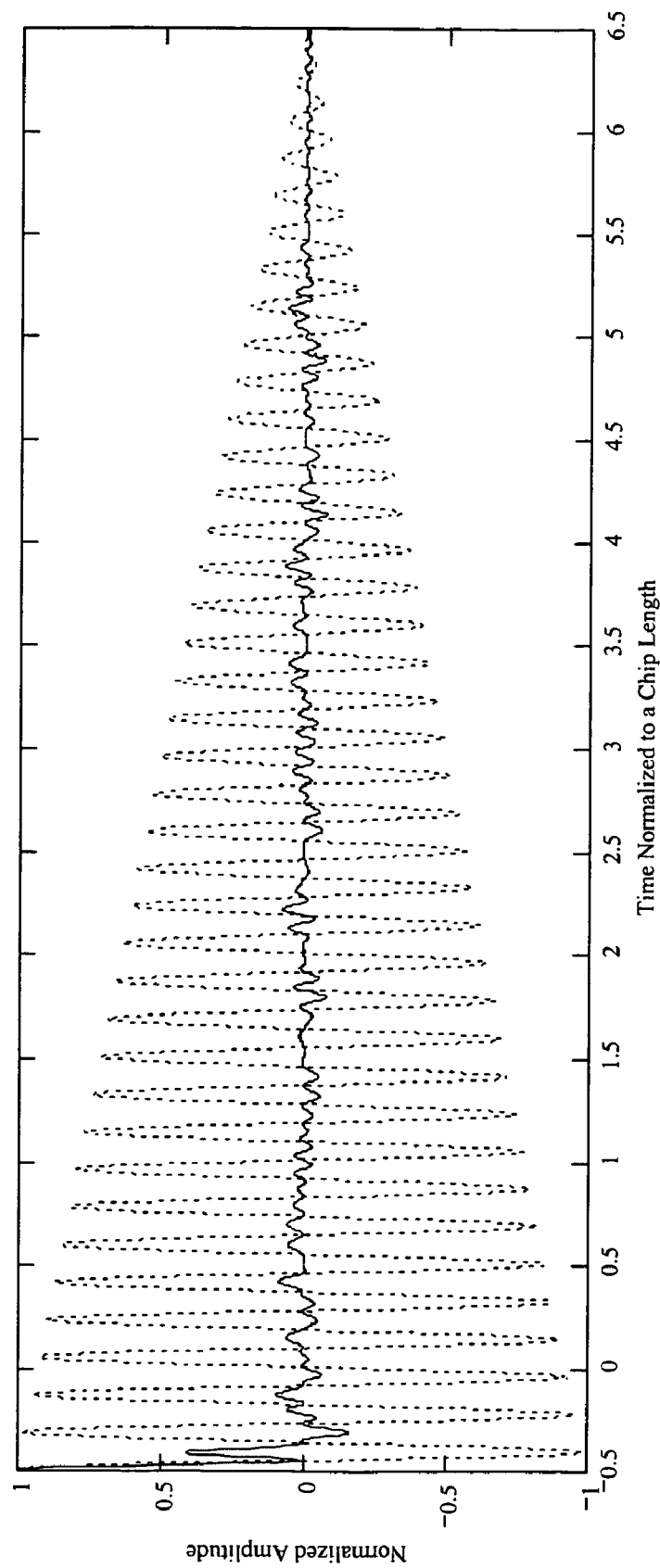
FIG. 5 shows the time autocorrelation (½ length) of a single carrier BPSK (dashed line) and a 7 chip OFC (solid line) signals having approximately the same time length.

The time domain autocorrelation for the signals is shown in FIG. 5 where the solid line represents the 7 chip orthogonal signal and the dashed line represents a single carrier signal. The peak autocorrelation is exactly the same, but the OFC compressed pulse width is approximately $0.28 \cdot \tau_C$, as compared with the single carrier compressed pulse width of approximately a bit width, $\tau_B = 7 \cdot \tau_C$. This provides the measure of the processing gain (PG), which is the ratio of the compressed pulse width to the bit length, or in this case, PG=49.

Figure 6:
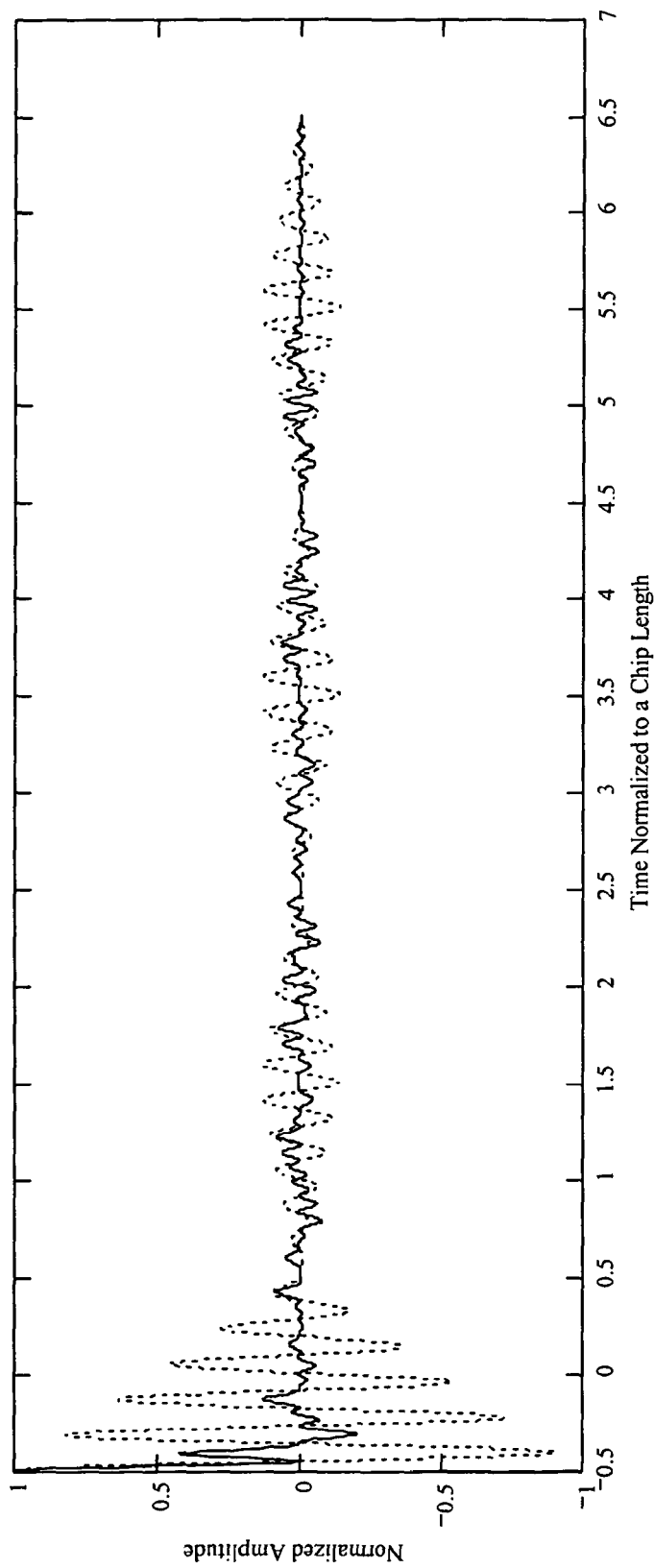
FIG. 6 shows the time autocorrelation (½ impulse length) of a single carrier PN code (dashed line) and a PN-OFC (solid line) signal having a 7 chip Barker code modulating the chips of both signals.

In addition to the OFC coding, each chip can be weighted as ±1, giving a pseudo noise (PN) code in addition to the OFC, namely PN-OFC. This does not provide any additional processing gain since there is no increase in the time bandwidth product, but does provide additional code diversity for tagging. FIG. 6 shows the autocorrelation of a 7 bit Barker code applied to an OFC (solid line) and a single carrier frequency (dashed line). The pseudo noise code has a compressed pulse width of $2 \cdot \tau_C$, or a $PG_{PN}=7$ as compared $PG_{PN\text{-}OFC}=49$. The compressed pulse width of the OFC is a function of the bandwidth spread and not the pseudo noise code; yielding comparable pulse-width and side lobes results, as shown in FIG. 5 without pseudo noise code and FIG. 6 with pseudo noise code.

Figure 7:
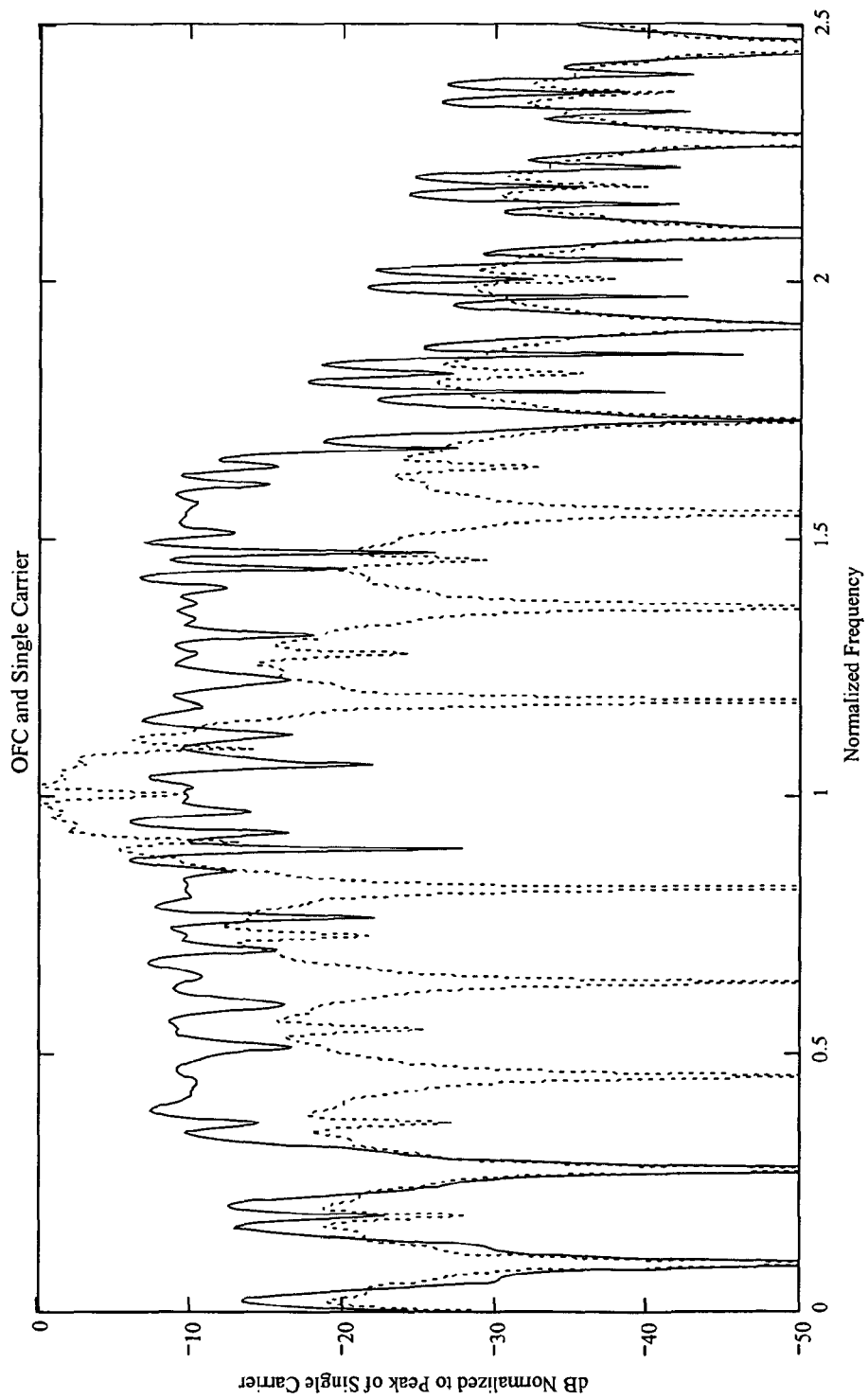
FIG. 7 shows the frequency response of a 7 chip PN-OFC signal (solid line) and a single carrier signal (dashed line).

FIG. 7 compares the waveforms of the frequency response of a 7-chip PN-OFC (solid line) and a single carrier pseudo noise signal (dashed line). As shown, each has approximately the same time lengths with the magnitudes normalized to the time amplitude peak of the pseudo noise response. The PN-OFC has an increased processing gain and a narrower compressed pulse peak over just the pseudo noise sequence, proportional to the bandwidth spreading of the OFC.

In the preferred embodiment, apparatus, systems, devices and methods of the present invention provides an orthogonal frequency coding technique for SAW sensors incorporating weighted reflectors to increase the number of chips that can be implemented, and consequently, increases the code density. The reflectors are weighted reflector grating that are designed for implementation of orthogonal frequency coded surface acoustic wave sensors. By spatially weighing reflectors, a variety of reflector stopband responses are implemented.

Figure 9:
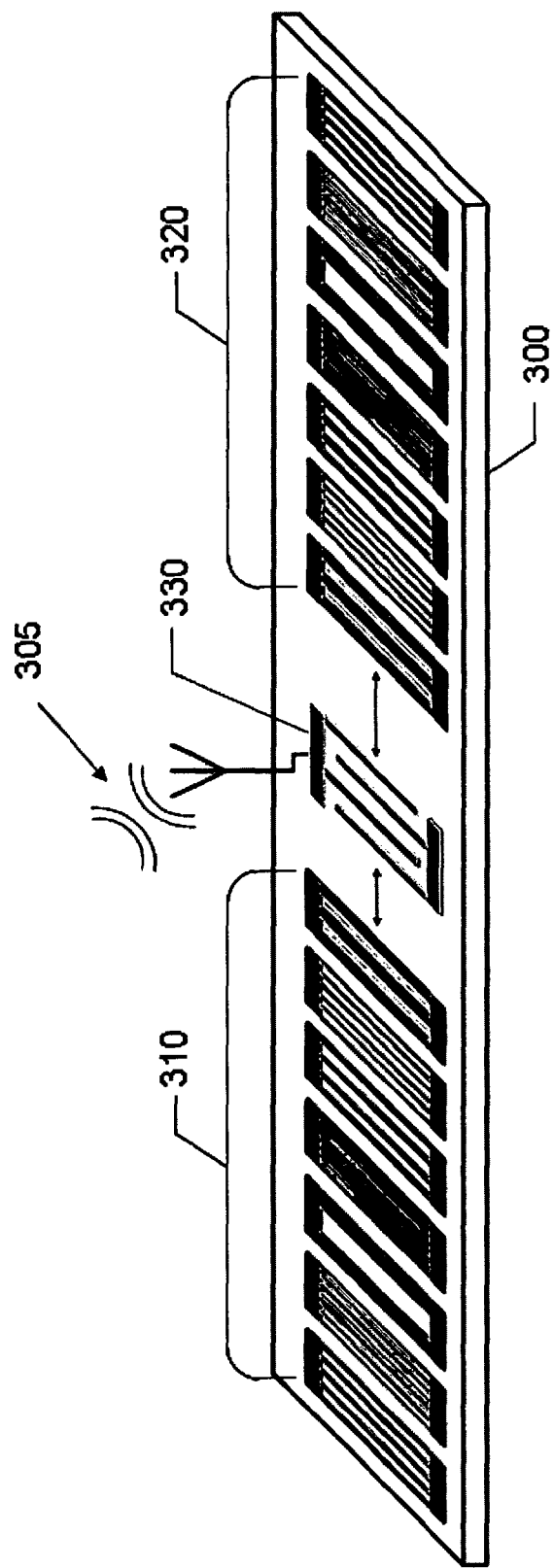
FIG. 9 is a schematic diagram of an example of an OFC SAW sensor implementation.

OFC waveforms can be employed in SAW devices using shorted periodic reflector gratings as shown in FIG. 9. Each chip of the OFC waveform is implemented using a shorted periodic reflector grating. The grating periodicities are chosen so that the grating center frequencies correspond to the chip carrier frequencies. In order to keep the chip length approximately constant, each grating must contain different numbers of electrodes as the periodicity changes. This is a direct result of the orthogonality condition. The equation used to find the grating electrode counts is shown below.

$$N_j = \tau_c \cdot f_j \tag{1}$$

This equation shows that the grating electrode count is directly proportional to frequency. In addition, the normalized metal thickness also increases with frequency. Therefore, in a device fabricated with a single metal thickness for all reflectors, the magnitude of SAW reflection for each chip will not be equal.

The device schematic shown in FIG. 9 is that of a temperature sensor which uses identical reflector banks on either side of a wideband transducer. However, different free space delays are employed on each side of the transducer. The impulse response of this device contains two identical approximations of the OFC signal shown in FIG. 2. During matched filtering, this device produces two compressed pulses. The separation between the pulses is proportional to device temperature.

Figure 10:
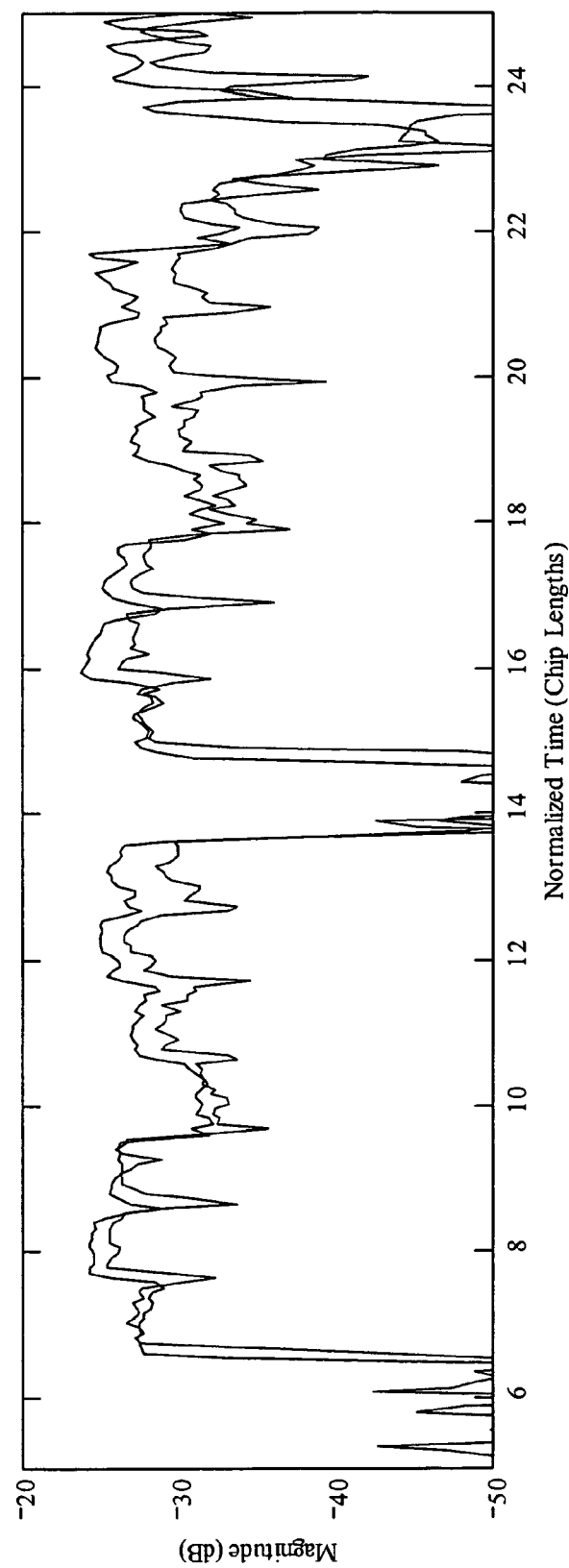
FIG. 10 shows two compressed pulses having a differential time delay between pulses.

The sensor includes reflector banks on either side of a wideband transducer as shown in FIG. 9. However, a different free space delay is employed on either side of the device designated by $\tau_1$ and $\tau_2$. The various chip amplitudes caused by the differences in SAW reflection described previously are observed. When this device is used with the transceiver shown in FIG. 9, two compressed pulses result as shown in FIG. 10. The differential time delay between pulses provides the signal.

The tag information is provided by a series of reflectors that map into a known chip sequence. The time-chip-sequence is coded by differentially OFC and PN sequences. Therefore, the implementation of OFC sensors requires reflectors having differing local carrier frequencies. In the case of narrow fractional bandwidths or high reflectivity (such as $LiNbO_3$) it is desirable to adjust the reflectivity per electrode in the various chips. Due to varying system requirements, the use of weighted reflectors is required; both apodized and variable weighted reflectors.

The present invention provides apparatus, devices, systems and methods using wideband input transducers and plural weighted reflector gratings on either side of the input transducer. Various reflector stopband responses are implemented by spatially weighting reflectors in a fashion similar to interdigital transducer apodization. The weighting technique of the present invention, reflectivity is decreased allowing more chips to be implemented and consequently, increases code diversity. As a result, more tags and sensors can be employed using a given bandwidth when compared with uniform reflectors. In addition, weighted reflector gratings makes various phase shifting schemes possible, such as inphase and quadrature implementations of coded waveforms, reducing the device size and increasing coding.

Weighted reflectors can be employed using withdrawal weighting or apodization. Both techniques rely on eliminating portions of the metallized surface used in a uniform reflector. As a result, weighted reflector designs accounts for velocity perturbations in order to keep wave fronts from different sections of the reflector phase coherent. For this reason, reflector velocity data is extracted for YZ LiNbO3.

Reflector velocities are extracted using the following equation derived from a transmission line model analogy.

$$Vg(h/\lambda, a/p) = v_{fs}[1 + (a/p \cdot \Delta v/v_{fs}) - (1/\pi \cdot B_0/Y_0 \sin a/p)] \quad (2)$$

Where $v_{fs}$=free space velocity
a/p=reflector grating duty cycle
h/λ=normalized metal thickness
This equation is a function of two independent variables, the reflector grating duty cycle and normalized metal thickness. The difference between metallized and free surface velocities, $\Delta v$, is proportional to the normalized metal thickness. The transmission line model uses a shunt susceptance term, $B_0/Y_0$, to account for stored energy at the front and back of each reflector electrode, and this term is proportional to the square of the normalized metal thickness.

Figure 11:
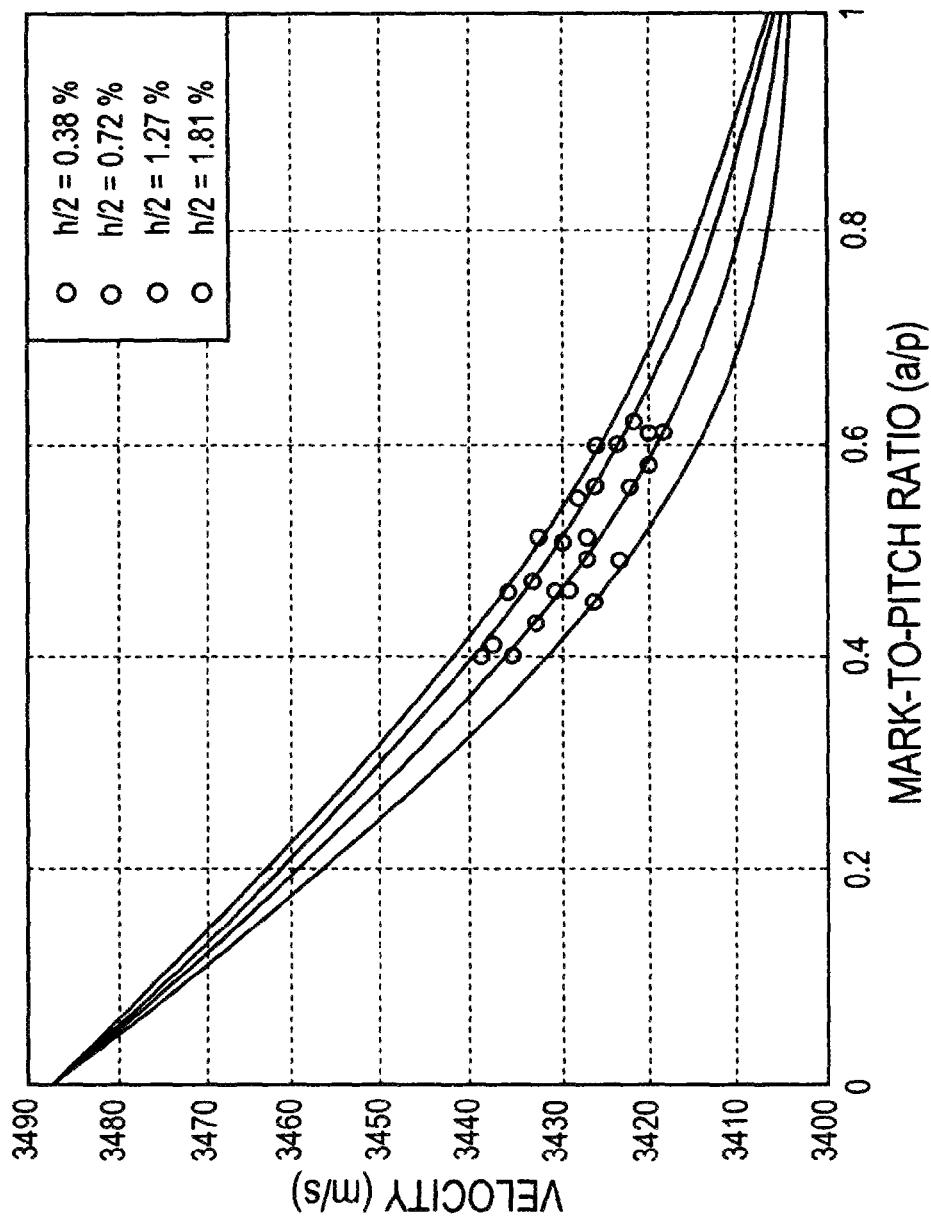
FIG. 11 is a graph showing velocity verses reflector duty cycle for four different normalized metal thicknesses.

The unknown terms in equation (2) are extracted using a test mask with several test structures. The test devices used a simple delay line with a reflector grating situated nearby. This embodiment is used in order to isolate just the reflector response using signal processing. The test mask contains thirty five devices each having different combinations of reflector grating duty cycle and center frequency wavelength. Seven wavelengths are used between 18 and 60 µm, and five reflector grating duty cycles between 40% and 60% are employed. The mask is fabricated on YZ LiNbO3, and signal processing techniques are applied to the swept frequency responses to extract the reflector grating velocity data. A three dimensional optimization is performed using the data in order to obtain the unknown terms in equation (2). The results for several metal thicknesses are shown in FIG. 11, which shows good agreement between measured and predicted results and that the curvature of each line is proportional to the normalized metal thickness. This is a direct result of the stored energy effect which has a large influence for thicker films.

As described previously, reflector weighting can be accomplished using withdrawal weighting or apodization. Previous studies of withdrawal weighting focused on eliminating unwanted modes in resonant cavities by shaping reflector frequency responses as described in T. Omori, J. Akasaka, M. Arai, K. Hashimoto, M. Yamaguchi, "Optimisation of weighted SAW grating reflectors with minimized time delay deviation," Proc. IEEE International Frequency Control Symposium and PDA Exhibition, 2001, pp. 666-670 for example. For OFC tag and sensor applications, the time domain response is of primary concern, and is better approximated through apodization.

Figure 12:
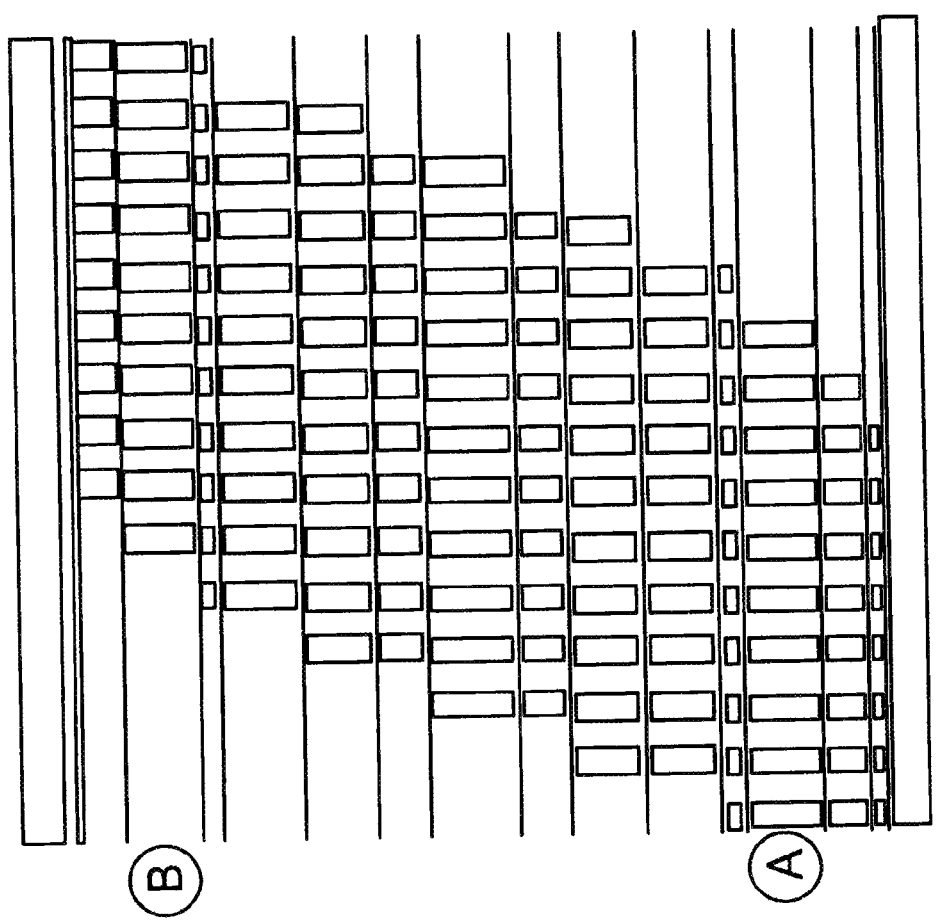
FIG. 12 is a schematic of a cosine weighted apodized reflector.

In an apodized reflector, each electrode covers a portion of the beam aperture defined by a sampled time window. As an example, FIG. 12 shows a schematic of a sixteen period cosine weighted reflector. The first eight electrodes are connected to the bottom bus bar, and the rest are connected at the top. This is done in order to reduce group delay variations over the reflector aperture. In order to simulate such a device, a two dimensional COM model was developed. The model is designed to segment the beam aperture into uniform tracks as shown in FIG. 12. The sum of each track's swept frequency response yields the overall reflector response.

When designing apodized reflectors, special care is taken to ensure phase coherence of the reflected waves from different tracks. For example, consider an incident wave on the left side of the reflector shown in FIG. 12. A portion of the wave is reflected from track A, and after a short delay, another portion is reflected from track B. This delay is implemented using a free surface which has a slightly higher velocity than within the electrodes. As a result, if no correction is made, the reflected waves from track A and B have a small phase difference. The initial free space delays must be extended slightly in order to keep the reflected waves coherent. The resulting electrodes are made up of several smaller rectangles that are staggered across the aperture as shown.

Figure 13:
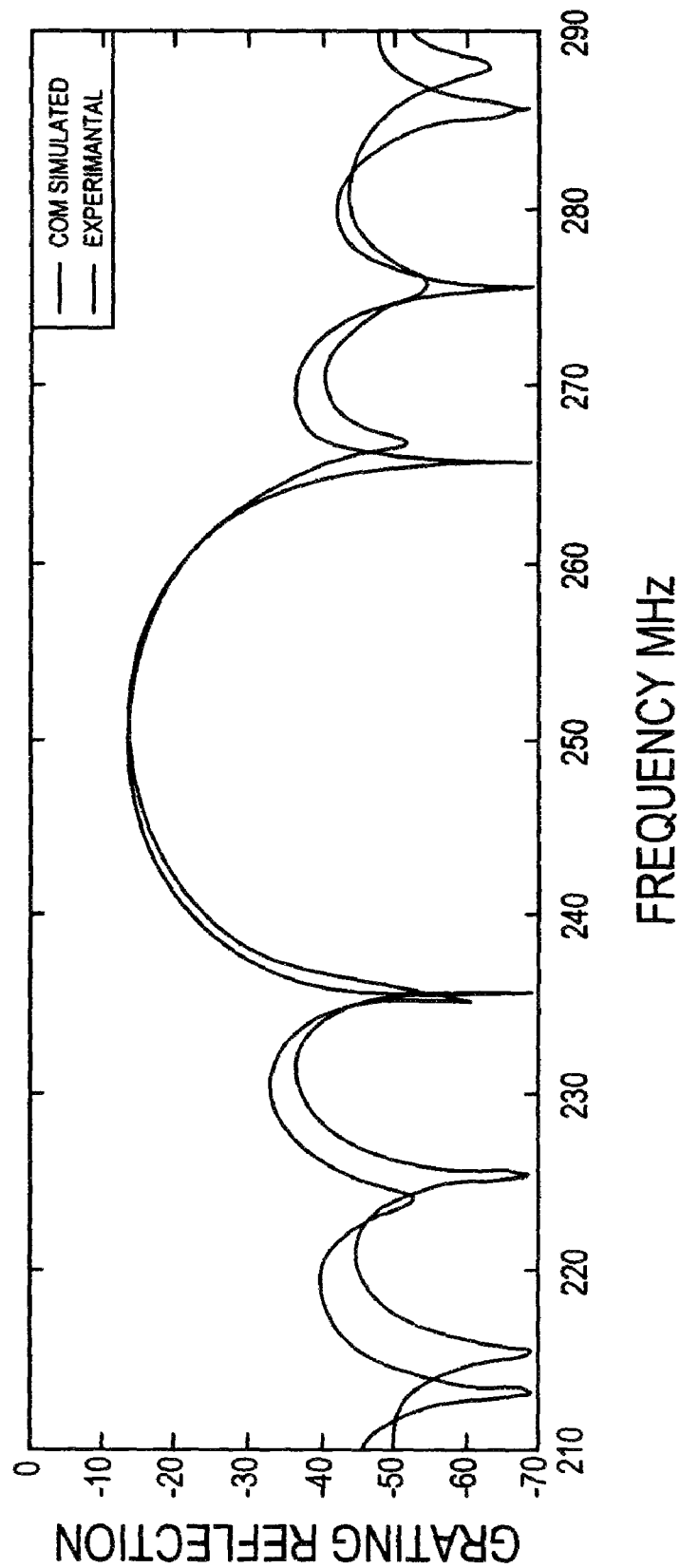
FIG. 13 shows 2-dimensional COM simulated and experimental responses of a 24 period cosine weighted apodized reflector.
Figure 14:
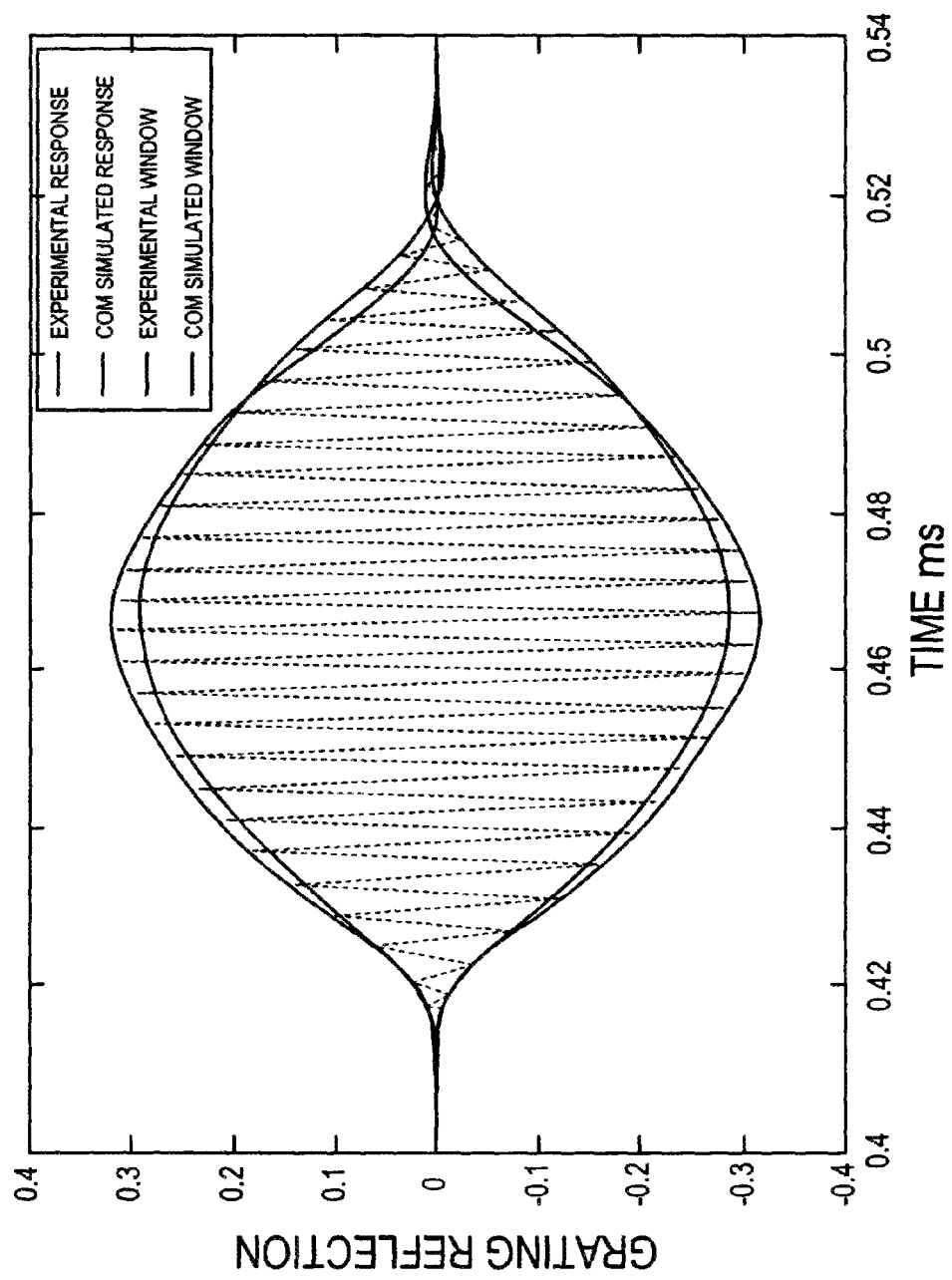
FIG. 14 is a 2-dimensional COM simulated and experimental cosine weighted reflector time domain responses.

Using the apodization technique described, a weighted reflector was designed and fabricated using a cosine window for operation on YZ LiNbO3 at 250 MHz. The fabricated reflector contained 24 periods and was placed near a simple delay line. The device's swept frequency response was obtained and signal processing was applied in order to isolate the reflector response. The device was also simulated using the 2-dimensional COM model, the simulated and experimental reflector responses are plotted in FIG. 13. Overall, there is good agreement between the simulated and predicted responses. However, the experimental response is nonsymmetrical and has wider bandwidth than the prediction. To gain a better understanding of the differences between the simulated and measured reflector responses, an FFT was applied to both. In FIG. 14, the time domain responses reveal that the experimental reflector response is shorter than the simulated which is expected due to the difference in their bandwidths. The errors are caused by phase differences of the reflected waves from each track of the reflector which underlines the importance of accurate velocity information when designing weighted reflectors.

Figure 15:
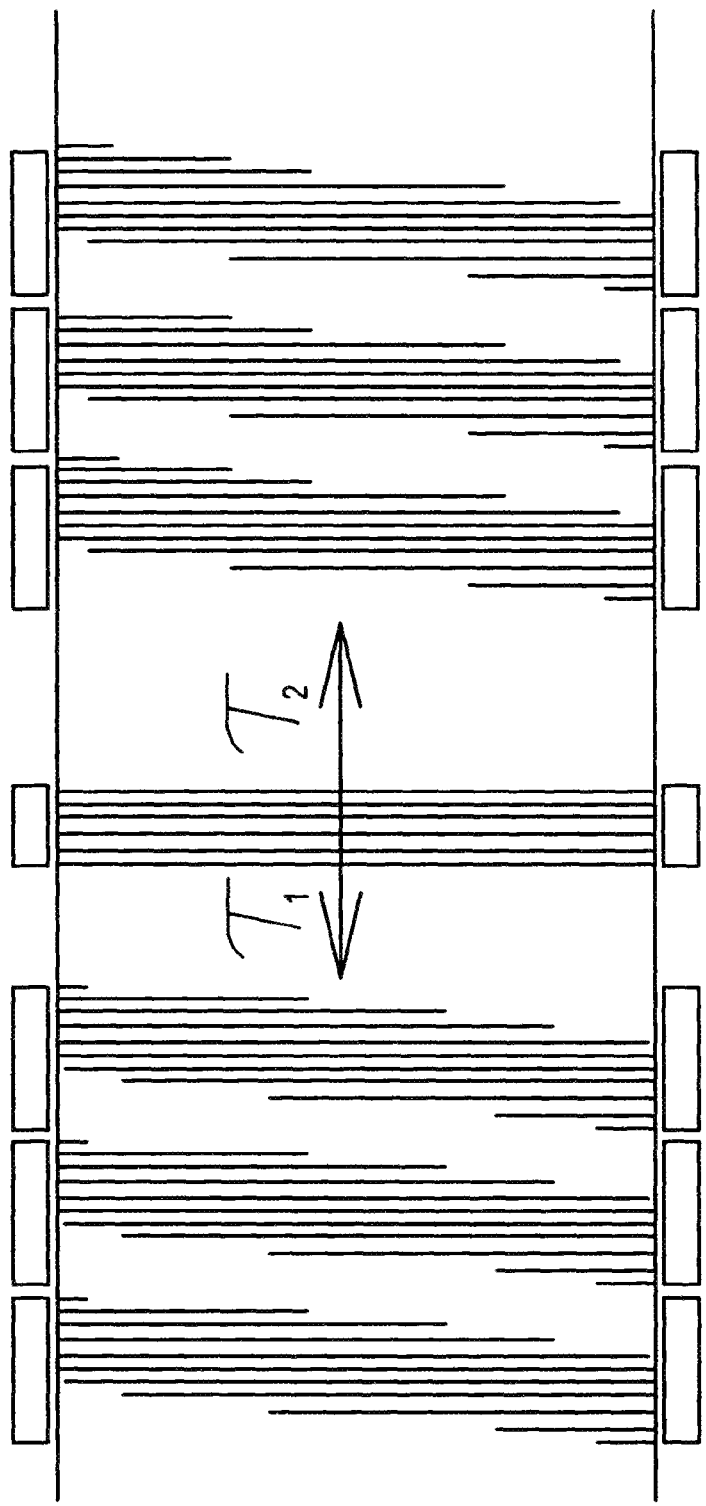
FIG. 15 is a schematic drawing of a three chip cosine weighted orthogonal frequency coded sensor.

Implementation of an OFC SAW temperature sensor was accomplished using cosine weighted reflectors. Previous studies have defined a set of orthogonal frequencies for uniform weighting as described in D. C. Malocha, D. Puccio, D. Gallagher, "Orthogonal frequency coding for SAW device applications," Proc. IEEE International Ultrasonics Symposium, 2004, pp. 1082-1085 and D. Puccio, D. C. Malocha, D. Gallagher, J. Hines, "SAW sensors using orthogonal frequency coding," Proc. IEEE International Frequency Control Symposium, 2004, pp. 307-310. Using a similar approach, orthogonal frequencies are defined for several window types. Orthogonal frequencies for cosine weighting are defined as $fn=2n \cdot \tau^{-1}$. Using this definition, a cosine weighted OFC temperature sensor was designed for operation on YZ LiNbO3. The sensor was implemented using three cosine weighted reflectors as shown in FIG. 15, and occupied a 24.5% fractional bandwidth centered at 250 MHz.

Figure 16:
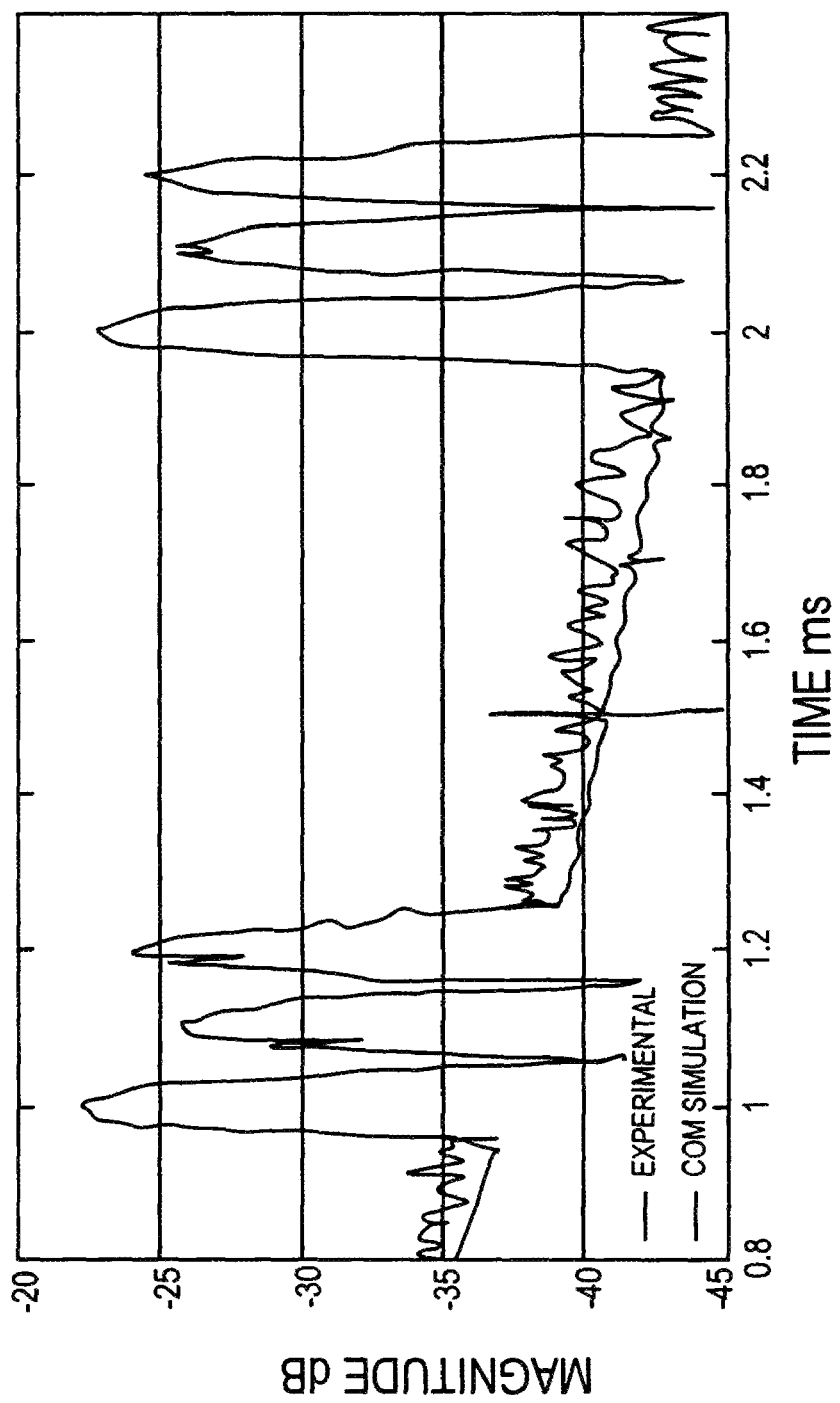
FIG. 16 shows simulated and experimental time domain responses of a three chip orthogonal frequency coded surface acoustic wave temperature sensor.

The device was simulated using the 2-dimensional COM model and verified by experiment using devices fabricated on YZ LiNbO3. The simulated and experimental responses have been transformed into the time domain using an FFT, and are shown in FIG. 16. The plot shows the cosine weighted reflector responses from either side of the transducer and shows good agreement between the measured and predicted responses.

Figure 17:
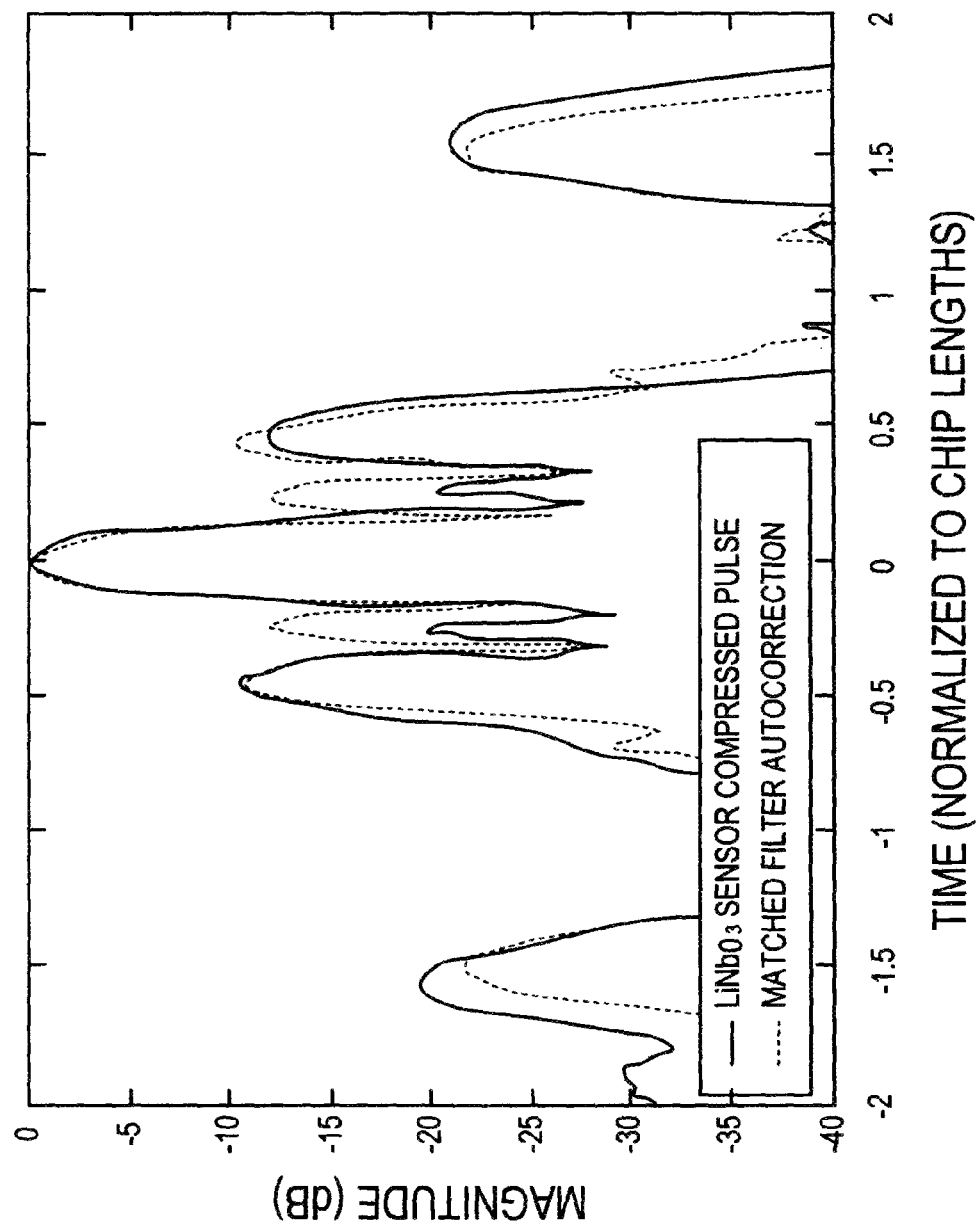
FIG. 17 is a graph showing a compressed pulse response.
Figure 18:
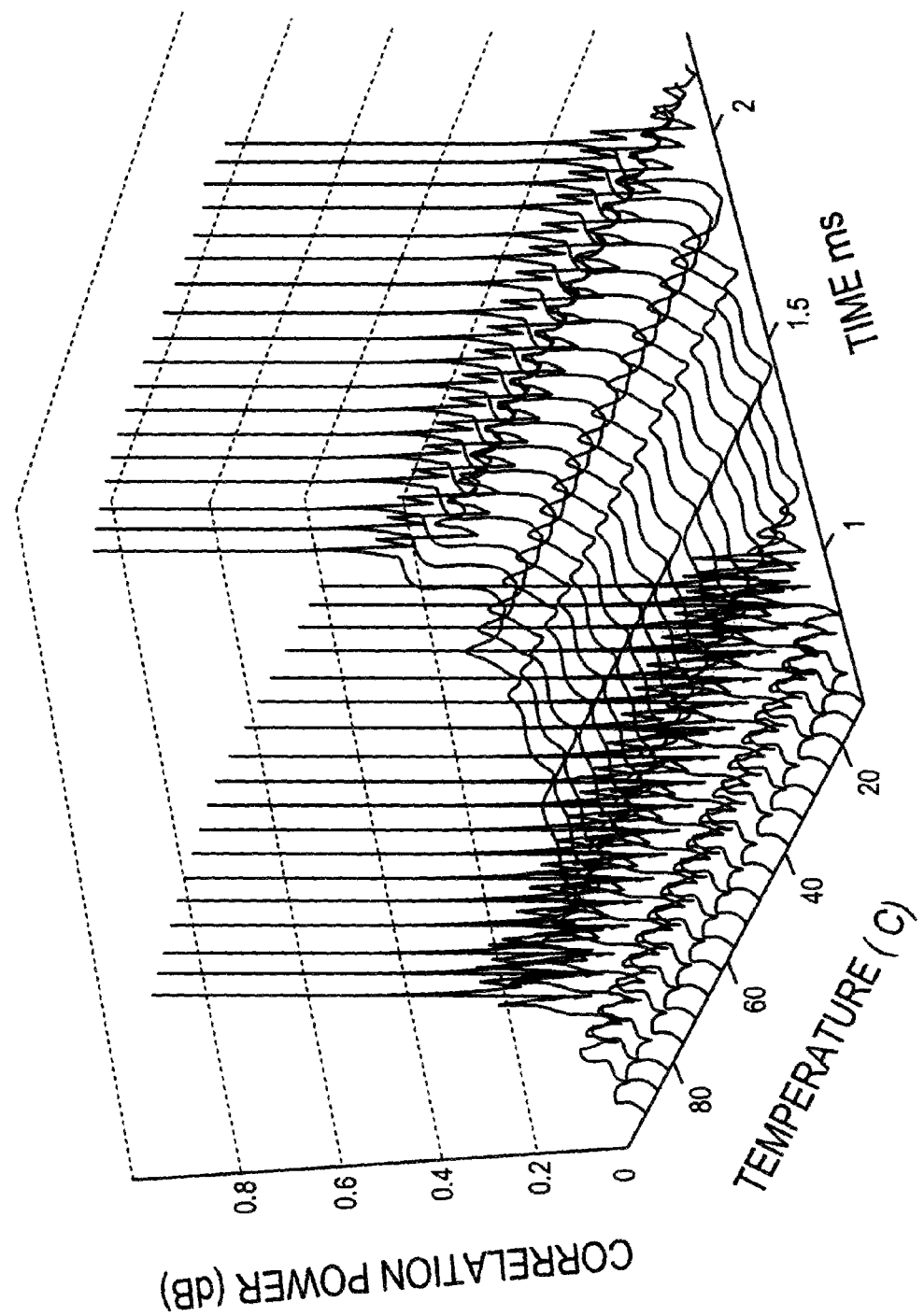
FIG. 18 is a 3-dimensional graph of a cosine weighted orthogonal frequency coded surface acoustic wave sensor compressed pulses.

The experimental response was then applied to a simulated transceiver; a compressed pulse response from one reflector bank is shown in FIG. 17. The autocorrelation of the matched filter is also shown for comparison. The two pulses are located one half chip length away on either side of the compressed pulse. These pulses are undesired, and subsequent calculations have shown that the level of these responses can be significantly reduced by implementing the device using inphase and quadrature channels along with PN coding. The OFC sensor was tested over temperature between 10° C. and 100° C. and the resulting compressed pulse responses are shown in FIG. 18. Using an adaptive matched filter, the pulse amplitude remains constant as temperature is varied.

Figure 8:
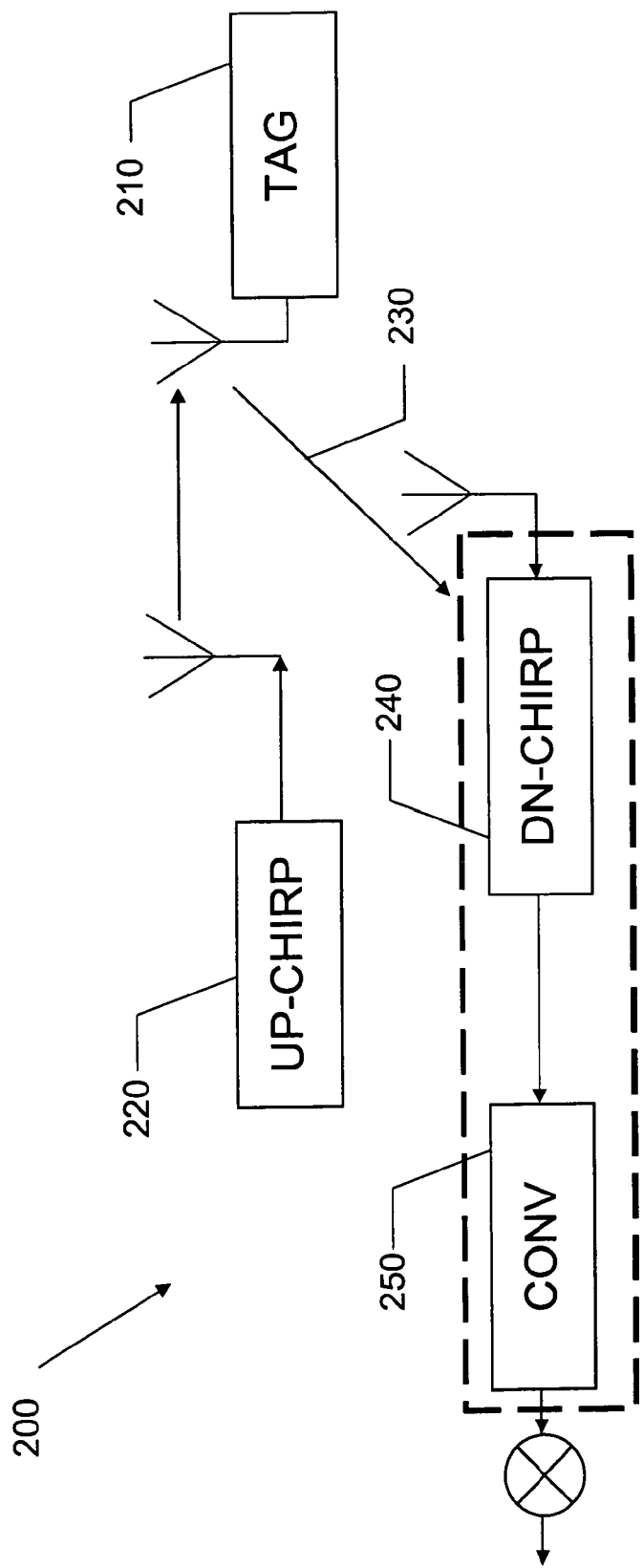
FIG. 8 is a block diagram of an example of an OFC SAW system according to the present invention.

The OFC SAW system 200 block diagram is shown in FIG. 8. The SAW tag 210 is interrogated with a linear stepped up chirp 220 possessing the same time length and bandwidth as the tag impulse response 230. For a given peak amplitude, the chirp provides increased power over a given bandwidth as compared to a simple RF tone burst. A noise-like tag response signal 230 is returned from the identification tag 210. Since orthogonal frequencies are used, the intersymbol interference is drastically reduced when compared with a conventional PN sequence. A band-limited version of the tag's impulse response results after a down chirp 240 is applied. The signal is then match filtered to produce a compressed pulse.

The OFC apparatus, systems, devices and methods of the present invention are readily applied to SAW sensing applications. An example of a SAW device according to the present invention is shown in FIG. 9. The device includes a wideband input transducer and multiple weighted reflector gratings 310 and 320 and operates in the differential mode using the bank of weighted reflector gratings 310 and 320 on either side of the transducer 300. The device receives 305 an orthogonal interrogation signal, and in response, transmits 305 an orthogonal frequency coded signal.

In summary, the present invention provides apparatus, methods systems and devices for the use of weighted reflectors in orthogonal frequency coded SAW tags and sensors. A review of OFC was given, and its application to SAW tags and sensors was demonstrated. The importance of accurate SAW velocity information was discussed, and velocity profiles were extracted for YZ LiNbO3. A description of the extraction technique was given, and a discussion of the results was provided.

Reflector withdrawal weighting and apodization were both considered as weighting techniques, and apodization was chosen as the optimal method for weighting OFC SAW devices. A description was given of apodized reflector design criteria including correcting errors due to velocity perturbations. The final apodized reflector design was optimized to reduce group delay variations across the beam aperture and ensure phase coherence of the reflected waves from each uniform section of the reflectors. In addition, a two dimensional COM model was developed in order to properly simulate the apodized reflector designs. The apodization design criteria were then applied to cosine weighted reflectors, and experimental devices fabricated on YZ LiNbO3 were compared with simulated responses generated by the 2-D COM model. The simulated and experimental reflector responses were very similar; however, subsequent analysis revealed small errors due to phase differences of the reflected waves from each uniform track of the reflector. These errors revealed the importance of accurate material velocity information when designing weighted reflectors. Lastly, an OFC SAW temperature sensor was implemented using cosine weighted reflectors.

The 250 MHz OFC SAW sensor was fabricated on YZ LiNbO3, and its swept frequency response agreed well with 2-D COM model predictions. The sensor was then tested over temperature and the responses were applied to a simulated transceiver which uses an adaptive matched filter. Using the adaptive matched filter, results were given showing that the compressed pulse amplitudes remained constant as temperature varied.

In summary, the present invention provides a new apparatus, system, device and method for using the OFC technique using weighted reflectors, including variable and apodized reflectors, provides a weighting technique that allows the designer to decrease reflectively when compared with a uniform reflector of the same length. In an orthogonal frequency coding tag or sensor, this allows for more chips to be implemented and, consequently, more coding diversity. As a result, more tags and sensors can be implemented using a given bandwidth when compared with uniform reflectors.

Additionally, the present invention makes various phase shifting schemes possible, such as in-phase and quadrature implementations of coded waveforms resulting in reduced device size and increased coding.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A system comprising:
    a tag for generating an orthogonal frequency coded identification signal for identifying a device, each tag including two or more banks of reflector gratings to generate the orthogonal frequency coded signal having plural contiguous stepped orthogonal frequencies within a bandwidth and a transducer coupled with the two or more banks of reflectors and an adaptive matched filter coupled between the at least two banks of reflectors for filtering the orthogonal frequency coded signal, wherein a pulse amplitude of the orthogonal frequency coded signal is approximately constant with a varying operating temperature; and
    a transceiver for transmitting an orthogonal interrogation signal to said tag and for receiving said orthogonal frequency coded identification signal generated by the tag in response to said interrogation signal.

2. The system of claim 1, wherein each of the two or more banks of reflectors comprises:
    plural reflectors for generating said plural contiguous stepped frequencies for said identification orthogonal frequency coded identification signal; and
    a tag transducer for receiving said orthogonal interrogation signal at said tag and transmitting an orthogonal coded signal generated by said tag in response to said orthogonal interrogation signal.

3. The system of claim 2, wherein said plural reflectors comprises:
    plural spatially weighted reflector gratings to produce plural reflector stopband responses.

4. The system of claim 1, wherein said tag comprises:
    plural identification tags, each of said plural identification tags comprising:

plural reflectors for generating a different orthogonal frequency coded identification signal having plural contiguous frequencies that are contiguous in time; and a tag transducer for receiving an orthogonal interrogation signal at said tag and transmitting said orthogonal coded identification signal generated by said tag in response to said orthogonal interrogation signal.

5. The system of claim 4, wherein each of said orthogonal coded identification signals comprises:

plural contiguous frequencies that are not sequential in frequency, wherein an order of said plural contiguous frequencies identifies each of the plural identification tags.

* * * * *